UNITED STATES PATENT OFFICE.

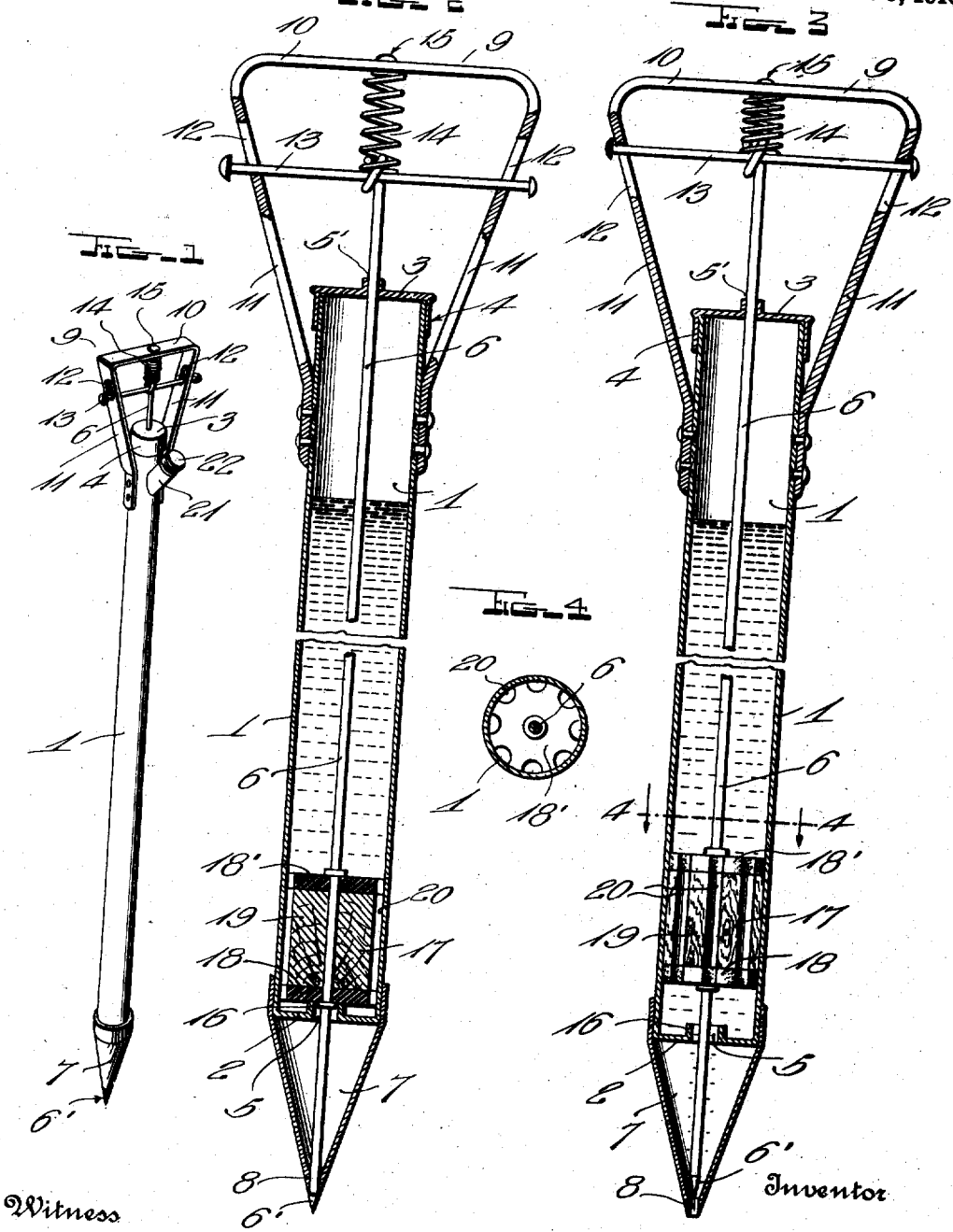

JOSEPH J. FLEMING, OF BOONE, IOWA.

WEED-EXTERMINATOR.

1,258,551.   Specification of Letters Patent.   Patented Mar. 5, 1918.

Application filed November 16, 1916. Serial No. 131,725.

*To all whom it may concern:*

Be it known that I, JOSEPH J. FLEMING, a citizen of the United States, residing at Boone, in the county of Boone and State of Iowa, have invented certain new and useful Improvements in Weed-Exterminators; and I do declare the following to be a full, clear, and exact description of the invention, such as will enable others skilled in the art to which it appertains to make and use the same.

This invention relates to improvements in means for destroying noxious insects and plant life.

The primary object of the invention is to provide a device of this character whereby a suitable liquid may be injected into the roots of weeds and other noxious plants, and into the soil about said roots so that the plant will be entirely destroyed.

An additional object is to provide an improved valve means for retaining the fluid within the receptacle comprising the exterminator.

With these general objects in view, the invention resides in the novel features of construction which will be hereinafter particularly described and claimed.

In the accompanying drawing:—

Figure 1 is a perspective view of my improved weed exterminator;

Fig. 2 is a central vertical sectional view showing the device in inoperative position;

Fig. 3 is a similar view showing the parts in operative position; and

Fig. 4 is a horizontal section on the line 4—4 of Fig. 3.

The invention comprises broadly a fluid container having a pointed end and means for liberating small quantities of the liquid through this end. The container 1 in which the exterminating fluid is contained is formed of a cylindrical tubular member closed at its bottom by a flat end piece 2 and at its top by a cap 3, the latter having an annular flange 4 which extends down around the sides of the member and is soldered or otherwise secured thereto. Both the end piece 2 and the cap 3 are provided with a central opening. The opening in the end piece 2 is designated by the numeral 5 while that in the cap 3 by the numeral 5', these openings being alined and adapted to receive a valve stem 6.

The bottom end of the cylindrical member 1 is provided with a conical shaped cap 7, the base of which is open and disposed around the side wall of said member, it being secured thereto in any preferred manner. The apex of this cap is open as shown at 8 and adapted to receive the lower end 6' of the valve stem 6 which projects beyond the opening 5. It is obvious that this opening 8 is also alined with the openings 5 and 5', since the the valve stem 6 is in the form of a straight rod.

As hereinbefore mentioned, the liquid contained in the member 1 is adapted to be disposed about the roots of the weeds to be killed, and in order that this may be accomplished, the lower end 6' of the valve stem and the adjacent portion of the cap 7 is inserted into the ground or the root of the weed. This end of the valve stem is retained in this position by a spring means disposed at the other end thereof. This means comprises a substantially inverted U-shaped handle 9 formed from a single piece of sheet metal, the base or cross bar 10 thereof being straight, while the ends of the arms 11 extend inwardly toward each other and are secured to the opposite sides of the container 1 adjacent the upper end thereof. The upper portions of the arms 11 adjacent their connection with the cross bar 10 are longitudinally slotted as shown at 12, the outer ends of a cross rod 13 being slidably disposed therein. The intermediate portion of this rod is connected with the upper end of the valve stem 6, and one end of an expansion helical spring 14 is attached to the rod at the same point, the other end of the spring being secured by a rivet or the like 15 to the intermediate portion of the cross bar 10. When the lower end of the device has been inserted in the weed, root or in the ground adjacent thereto, the operator passes his hand around the cross bar 10 and the rod 13 and squeezes the same together, thus compressing the spring 14 and raising the valve stem 6. This upward movement of the valve stem causes the end 6' thereof to be moved within the cap 7 and at the same time opens a valve to permit a small supply of exterminating liquid to flow from the opening 8 in said cap. This opening 8 is prevented from becoming clogged by dirt or the like because of the normal position of the end 6' of the valve stem which is extended through the apex of the cap 7 as shown in Fig. 2.

The opening 5 through which the valve stem slides is surrounded by a flange or collar 16 and this together with the end piece 2 forms a valve seat for the valve 17 carried by the intermediate portion of said stem 6. This valve consists of a pair of spaced apart resilient, preferably rubber, washers 18 and 18' through the central portion of which the valve stem 6 extends, the washer 18 which is the lowermost one tightly engages the valve seat whenever said stem is in its extended position. Between these washers is positioned a cylinder 19 of wood or similar material, said cylinder 19 also surrounding the valve stem. Liquid from the upper portion of the container 1 flows through grooves or recesses 20 in the peripheries of the washers 18 and 18' and the wooden cylinder 19 to the valve seat so that when said valve is raised it may flow through the opening 5. The liquid flowing through the recess 20 is thoroughly agitated thereby assuring a good mixture of the exterminating fluid.

Any preferred means may be provided for filling the container 1. One that is preferably used consists of a spout 21 formed integrally with the upper portion of the container. This spout is provided with a screw cap 22 for retaining liquid in the container.

Containers of various capacities may be constructed and various other minor changes may be made in the device without departing from the principles of the invention as hereinafter claimed.

I claim as my invention:—

In a device of the character described, a cylindrical tubular member having its ends closed by flat end pieces, said end pieces being provided with centrally disposed openings, the lower end piece being provided with an inwardly extending flange around said opening to form a valve seat, a conical shaped cap open at its base and surrounding the lower end of said member, said cap having an opening at its apex alined with the aforesaid openings, a valve carried by said stem intermediate its ends, said valve consisting of a cylindrical block surrounding the stem, a flexible washer disposed between said block and the valve seat on the lower end of said member, said block and washer having passageways in the outer peripheries and means for actuating said valve stem.

In testimony whereof I have hereunto set my hand in the presence of two subscribing witnesses.

JOSEPH J. FLEMING.

Witnesses:
 THOMAS R. WALL,
 AGNES PETERSON.

Copies of this patent may be obtained for five cents each, by addressing the "Commissioner of Patents, Washington, D. C."